(12) United States Patent
Kim

(10) Patent No.: US 11,292,313 B2
(45) Date of Patent: Apr. 5, 2022

(54) HEAT PUMP SYSTEM FOR VEHICLE

(71) Applicants: Hyundai Motor Company, Seoul (KR); Kia Motors Corporation, Seoul (KR)

(72) Inventor: Jae Yeon Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 281 days.

(21) Appl. No.: 15/987,410

(22) Filed: May 23, 2018

(65) Prior Publication Data

US 2019/0176563 A1 Jun. 13, 2019

(30) Foreign Application Priority Data

Dec. 11, 2017 (KR) .................. 10-2017-0169587

(51) Int. Cl.
*B60H 1/00* (2006.01)
*B60H 1/03* (2006.01)
(Continued)

(52) U.S. Cl.
CPC ......... *B60H 1/004* (2013.01); *B60H 1/00278* (2013.01); *B60H 1/00328* (2013.01); *B60H 1/00485* (2013.01); *B60H 1/00885* (2013.01); *B60H 1/00899* (2013.01); *B60H 1/034* (2013.01); *B60H 1/06* (2013.01);
(Continued)

(58) Field of Classification Search
CPC ... B60H 1/00; B60H 1/03; B60H 1/06; B60H 1/32; B60H 1/004; B60H 1/00278; B60H 1/00485; B60H 1/0085; B60H 1/034; B60H 1/00885; B60H 1/00328; B60H 1/323; B60H 1/00899; B60H 2001/00942; B60H 2001/00928
See application file for complete search history.

(56) References Cited

U.S. PATENT DOCUMENTS 6,170,270 B1  1/2001 Arshansky et al.
8,899,062 B2 12/2014 Kadle et al.
(Continued)

FOREIGN PATENT DOCUMENTS

CN   103380339 B    1/2016
DE   102015200334 A1 * 7/2016 ......... B60H 1/00278

*Primary Examiner* — Harry E Arant
(74) *Attorney, Agent, or Firm* — Mintz Levin Cohn Ferris Glovsky and Popeo, P.C.; Peter F. Corless

(57) ABSTRACT

A heat pump system for a vehicle is provided. The system includes an engine cooling device having a first radiator and a first water pump connected via a first coolant line. An electrical equipment cooling device includes a second radiator and a second water pump connected via a second coolant line. A battery module is disposed in a battery coolant line selectively connected with the second coolant line. An air conditioner is connected with the battery coolant line and includes a third water pump and a cooler disposed in the first connection line. A heating device is connected with the first coolant line via a third valve and includes a fourth water pump and a heater disposed in the second connection line. A centralized energy (CE) module supplies a coolant to the air conditioner, is connected with the coolant lines to supply a high-temperature coolant to the heating device.

16 Claims, 6 Drawing Sheets

(51) Int. Cl.
*B60H 1/06* (2006.01)
*B60H 1/32* (2006.01)
*B60H 1/14* (2006.01)

(52) U.S. Cl.
CPC ............ *B60H 1/143* (2013.01); *B60H 1/323* (2013.01); *B60H 1/3205* (2013.01); *B60H 1/32284* (2019.05); *B60H 2001/00307* (2013.01); *B60H 2001/00928* (2013.01); *B60H 2001/00942* (2013.01)

(56) References Cited

U.S. PATENT DOCUMENTS

| | | |
|---|---|---|
| 9,109,840 B2 | 8/2015 | Kadle et al. |
| 9,239,193 B2 | 1/2016 | Kadle et al. |
| 2005/0022938 A1 | 2/2005 | Masuda |
| 2012/0174602 A1* | 7/2012 | Olivier .................. B60H 1/005 62/79 |
| 2013/0283838 A1 | 10/2013 | Kadle et al. |
| 2014/0020415 A1* | 1/2014 | Heyl ....................... F25B 13/00 62/119 |
| 2017/0087957 A1* | 3/2017 | Blatchley ........... B60H 1/00392 |
| 2017/0197490 A1* | 7/2017 | Enomoto ........... B60H 1/00899 |
| 2017/0253105 A1* | 9/2017 | Allgaeuer .......... B60H 1/00428 |

\* cited by examiner

HEAT PUMP SYSTEM FOR VEHICLE

CROSS-REFERENCE TO RELATED APPLICATION

This application claims priority to and the benefit of Korean Patent Application No. 10-2017-0169587 filed on Dec. 11, 2017, the entire contents of which are incorporated herein by reference.

BACKGROUND

(a) Field of the Invention

The present invention relates to a heat pump system for a vehicle, and more particularly, to a heat pump system for a vehicle, which cools or heats the interior of a hybrid vehicle that uses an engine and a driving torque of a motor by selectively using a high-temperature coolant and a low-temperature coolant.

(b) Description of the Related Art

In general, an air conditioner for a vehicle includes an air conditioning system that circulates a refrigerant to heat or cool the interior of the vehicle. The air conditioning system maintains a comfortable indoor environment by maintaining a temperature of the interior of the vehicle at an appropriate or desired temperature regardless of a temperature change outside the vehicle. The system is configured to heat or cool the interior of the vehicle through heat-exchange by an evaporator while a refrigerant discharged by driving of a compressor circulates back to the compressor through a receiver dryer, an expansion valve, and the evaporator. In other words, a high-temperature and high-pressure gaseous refrigerant compressed by the compressor is condensed by the condenser, and then the temperature and humidity of the interior of the vehicle are reduced through evaporation executed in the evaporator through the receiver dryer and the expansion valve.

Recently, as interests in energy efficiency and an environmental contamination problem have increased, there is a need to develop an environmentally-friendly vehicle capable of replacing an internal-combustion engine vehicle. The environmentally-friendly vehicle is typically divided into an electric vehicle driven using a fuel cell or electricity as a power source, and a hybrid vehicle driven using an engine and an electric battery.

An air conditioner, by which no additional heat is used, unlike an air conditioner of a general vehicle, that is applied to an environmentally-friendly vehicle such as an electric vehicle or a hybrid vehicle among the environmentally-friendly vehicles, is generally referred to as a heat pump system. The electric vehicle converts chemical reaction energy of oxygen and hydrogen into electrical energy to generate driving torque, and in this process, heat energy is generated by the chemical reaction within a fuel cell, and it is essential to effectively remove the generated heat for securing performance of the fuel cell.

Further, the hybrid vehicle generates driving torque by driving a motor using electricity supplied from the fuel cell or an electric battery together with an engine operated using a general fuel, and thus, when heat generated from the fuel cell, the battery, and the motor is effectively removed, performance of the motor may be secured. Accordingly, a hybrid vehicle or an electric vehicle according to the related art requires a separate closed circuit as a battery cooling system together with a motor, electrical equipment, and a cooling device to prevent a battery including a fuel cell from generating heat, and a heat pump system.

Thus, the overall size and weight of a cooling module disposed in a forward direction of a vehicle increases, and a layout of connection pipes for supplying a refrigerant and a coolant to a heat pump system, a cooling device, and the battery cooling system within an engine compartment becomes complex. Further, to achieve optimal performance of the battery, a battery cooling system for heating or cooling the battery according to a state of the vehicle is provided separately. A plurality of valves for connecting connection pipes with each other are also provided. Due to frequent opening/closing operations of the valves, noise and vibration are transferred to an inside of the vehicle and thus, ride comfort is deteriorated.

The above information disclosed in this section is merely for enhancement of understanding of the background of the invention and therefore it may contain information that does not form the prior art that is already known in this country to a person of ordinary skill in the art.

SUMMARY

The present invention provides a heat pump system for a vehicle having advantages of selectively heat-exchanging heat energy generated from a coolant with a coolant upon condensation and evaporation of the coolant to adjust an internal temperature of the vehicle using the heat-exchanged coolant of a low temperature or a high temperature.

Another purpose of the present invention is to provide a heat pump system for a vehicle which improves the heating efficiency of the vehicle using waste heat of electrical equipment and a battery module, and the travel distance of the vehicle, by efficiently operating a battery module to represent the optimal performance of the battery module.

A heat pump system for a vehicle according to an exemplary embodiment of the present invention may include: an engine cooling device that includes a first radiator and a first water pump connected via a first coolant line, and configured to circulate a coolant in an engine; an electrical equipment cooling device that includes a second radiator and a second water pump connected via a second coolant line, and configured to circulate the coolant in the second coolant line; a battery module disposed in a battery coolant line that is selectively connected with the second coolant line by a first valve; an air conditioner connected with the battery coolant line via a second valve, in which a first connection line is formed to cool the interior of the vehicle by selectively forming an independent closed circuit, and that includes a third water pump and a cooler disposed in the first connection line; a heating device connected with the first coolant line via a third valve, in which a second connection line is formed to heat the interior of the vehicle by selectively forming an independent closed circuit, and that includes a fourth water pump and a heater disposed in the second connection line; and a centralized energy (CE) module configured to supply a low-temperature coolant to the air conditioner, connected with the second coolant line, the first connection line, and the second connection line to supply a high-temperature coolant to the heating device, and configured to selectively heat-exchange heat energy generated from condensation and evaporation of a refrigerant that circulates inside with the coolant.

The electrical equipment cooling device may be configured to cool electrical equipment or cool the battery module using a coolant that circulates along the second coolant line.

The CE module may include: a main heat exchanger disposed in the second coolant line between the second radiator and the battery module, and configured to evaporate or condense a refrigerant; an expansion valve connected with the main heat exchanger via a refrigerant line; an evaporator connected with the expansion valve via the refrigerant line, and provided in the first connection line to cool a refrigerant that circulates along the first connection line in the air conditioner; and a compressor disposed in the refrigerant line between the evaporator and the main heat exchanger.

An internal heat exchanger may be disposed in the refrigerant line between the evaporator and the compressor. The internal heat exchanger may be connected with the refrigerant line that connects the main heat exchanger and the expansion valve, and the refrigerant line that connects the evaporator and the compressor. When the main heat exchanger condenses a refrigerant, the internal heat exchanger may additionally condense the refrigerant condensed in the main heat exchanger through heat-exchange with a low-temperature refrigerant discharged from the evaporator, and may introduce the additionally condensed refrigerant to the expansion valve.

The first valve may selectively connect the second coolant line and the battery coolant line between the second radiator and the battery module, the second valve may selectively connect the battery coolant line and the first connection line, and the third valve may selectively connect the first coolant line and the second connection line to adjust flow of the coolant. The CE module may be connected with the compressor between the main heat exchanger and the compressor via the refrigerant line, and may further include, a sub-condenser disposed in the second connection line to heat a coolant that circulates along the second connection line in the heating device; and a sub-expansion valve disposed in the refrigerant line between the sub-condenser and the main heat exchanger.

In the engine cooling device, a first branch line connected with the first coolant line between the first radiator and the engine via a thermostat disposed in the first coolant line between the first radiator and the first water pump may be provided, in the battery coolant line, a second branch line that connects the battery module with the air conditioner through the first valve and closes connection with the electrical equipment cooling device may be provided, in the second coolant line, a third branch line that separates the battery coolant line and the second coolant line may be provided, and a fourth branch line that is connected with the second coolant line between the second radiator and the second water pump through a fourth valve may be provided in the second coolant line that connects electrical equipment.

When the battery module is cooled together with the electrical equipment in a cooling mode of the vehicle, the second branch line may be opened by operation of the first valve, the third branch line may be opened, and the connection between the second coolant line and the battery coolant line may be closed by the opened second and third branch lines, the battery coolant line connected with the battery module may be connected with the first connection line by operation of the second valve, the fourth branch line may be closed by operation of the fourth valve, and a refrigerant may be circulated, the main heat exchanger may be configured to condense the refrigerant, and the sub-condenser and the sub-expansion valve may be configured to stop operation in the CE module.

Further, the evaporator may be configured to cool a coolant that circulates into the first connection line from the battery coolant line by operation of the second valve with heat-exchange with a low-temperature evaporated refrigerant, a low-temperature coolant having passed through the evaporator may be supplied to the cooler along the first connection line by operation of the third water pump, and the low-temperature coolant having passed through the cooler may be supplied to the battery module along the battery coolant line that is connected with the first connection line by operation of the second valve to cool the battery module. In the electrical equipment cooling device, the opened third branch line may be connected to the second coolant line such that an independent closed circuit is formed, and a coolant cooled in the second radiator may cool the electrical equipment while circulating by operation of the second water pump.

When a heating mode of the vehicle is executed using the engine cooling device, the first branch line may be opened by operation of the thermostat, the first coolant line and the second connection line may be connected with each other by operation of the third valve, and the first coolant line that connects the thermostat and the first radiator may be closed, a coolant having an increased temperature while passing through the engine may be supplied to the second connection line through the third valve while circulating along the first coolant line and the first branch line, in the heating device, a high-temperature coolant that circulates along the second connection line may be supplied to the heater from the first coolant line by operation of the fourth water pump, and circulation of the refrigeration may stop in the CE module.

When a heating mode of the vehicle is executed using the electrical equipment cooling device, the second branch line may be closed by operation of the first valve, and the third branch line may be opened, the second coolant line that connects the electrical equipment and the second radiator may be closed when the fourth branch line is opened by operation of the fourth valve in the electrical equipment cooling device, the second connection line may form an independent closed circuit by operation of the third valve, a coolant may circulate along the second connection line by operation of the fourth water pump in the heating device, and a refrigerant may circulate, the expansion valve and the evaporator may be configured to stop operation, and the sub-expansion valve may be configured to operate to expand a refrigerant having passed through the sub-condenser and may be configured to supply the expanded refrigerant to the main heat exchanger in the CE module.

Additionally, waste heat generated from the electrical equipment may increase a temperature of a coolant that circulates along the second coolant line, the coolant having increased temperature may be recovered while increasing a temperature of a refrigerant that passes through the main heat exchanger, and the coolant circulating along the second connection line may be supplied to the heater while being heated through heat-exchange with a high-temperature refrigerant supplied from the compressor in the sub-condenser.

When a heating mode of the vehicle is executed using the engine cooling device and the electrical equipment cooling device, the first branch line may be opened by operation of the thermostat, the first coolant line and the second connection line may be connected with each other by operation of the third valve, and the first coolant line that connects the thermostat and the first radiator may be closed, the second branch line may be closed by operation of the first valve, the third branch line may be opened, and the second coolant line that connects the electrical equipment and the second radiator may be closed when the fourth branch line is opened by operation of the fourth valve in the electrical equipment cooling device, a coolant having an increased temperature while passing through the engine may be supplied to the second connection line through the third valve while circulating along the first coolant line and the first branch line, a high-temperature coolant that circulates along the second connection line may be supplied to the heater from the first coolant line by operation of the fourth water pump in the heating device, and a refrigerant circulates, the expansion valve and the evaporator may be configured to stop operation, and the sub-expansion valve may be configured to operate to expand a refrigerant having passed through the sub-condenser and may be configured to supply the expanded refrigerant to the main heat exchanger in the CE module.

Additionally, waste heat generated from the engine and the electrical equipment may increase a temperature of a coolant that circulates along the first, second, and third coolant lines, a coolant having an increased temperature, circulating along the second coolant line, may be recovered while increasing a temperature of a refrigerant that passes through the main heat exchanger, and a high-temperature coolant that circulates along the second connection line from the first coolant line may be further heated through heat-exchange with a high-temperature refrigerant supplied from the compressor in the sub-condenser and then supplied to the heater in the heating device.

In a dehumidifying mode of the vehicle, the first branch line may be opened by operation of the thermostat, the first coolant line and the second connection line may be connected with each other by operation of the third valve, and the first coolant line that connects the thermostat and the first radiator may be closed, the third branch line may be opened, and the second coolant that connects the electrical equipment and the second radiator may be closed while the fourth branch line is opened by operation of the fourth valve, a coolant having an increased temperature while passing through the engine may be supplied to the second connection line via the third valve while circulating along the first coolant line and the first branch line, a high-temperature coolant that circulates along the second connection line from the first coolant line may be supplied to the heater by operation of the fourth water pump in the heating device, the first connection line may form an independent closed circuit by operation of the second valve in the air conditioner, and a refrigerant may circulate, the main heat exchanger may be configured to condense the refrigerant, and the sub-condenser and the sub-expansion valve may be configured to stop operation in the CE module.

The evaporator may be configured to cool a coolant that circulates to the first connection line by operation of the second valve through heat-exchange with a low-temperature evaporated refrigerant, and a low-temperature coolant having passed through the evaporator may be supplied to the cooler along the first connection line by operation of the third water pump.

Moreover, a reservoir tank connected with the fourth branch line may be disposed between the second radiator and the main heat exchanger. The main heat exchanger, the sub-condenser, and the evaporator may be a water cooling heat exchanger into which a coolant is introduced. A refrigerant that circulates in the CE module may be an R152-a, R744, or R290 refrigerant. The electrical equipment may include a motor, an electric power control unit (EPCU), or an on board charger (OBC), the motor and the EPCU generate heat while traveling, and the OBC may generate heat when charging the battery module. The heating device may further include an internal heater disposed at the second connection line.

As described above, in the heat pump system for a vehicle according to an exemplary embodiment of the present invention, a system may be simplified and a layout of connection pipes in which a coolant circulates may be simplified by selectively heat-exchanging heat energy generated from a refrigerant with a coolant upon condensation and evaporation of the refrigerant to adjust an internal temperature of the vehicle using the heat-exchanged coolant of a low temperature or a high temperature.

Further, the present invention may improve heating efficiency of the vehicle using waste heat of electrical equipment and a battery module, and may increase the travel distance of the vehicle through efficient temperature control of a battery module to obtain optimal performance of the battery module. Moreover, the present invention may reduce an overall size and a weight by packaging a centralized energy module (CE module) for generating heat energy through condensation and evaporation of a coolant.

In addition, the present invention may prevent noise, vibration, and operational instability from being generated as compared with an air conditioner according to the related art by using a high performance R152-a, R744, or R290 refrigerant in a CE module. Furthermore, the present invention may increase sub-cooling of a refrigerant to improve cooling performance and efficiency by configuring a sub-condenser and an internal heat exchanger together to increase a condensation amount of the refrigerant in the CE module. In addition, the present invention may reduce a manufacturing cost and a weight, and may improve space utilization by simplifying the entire system.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SYMBOLS

Figure 1:
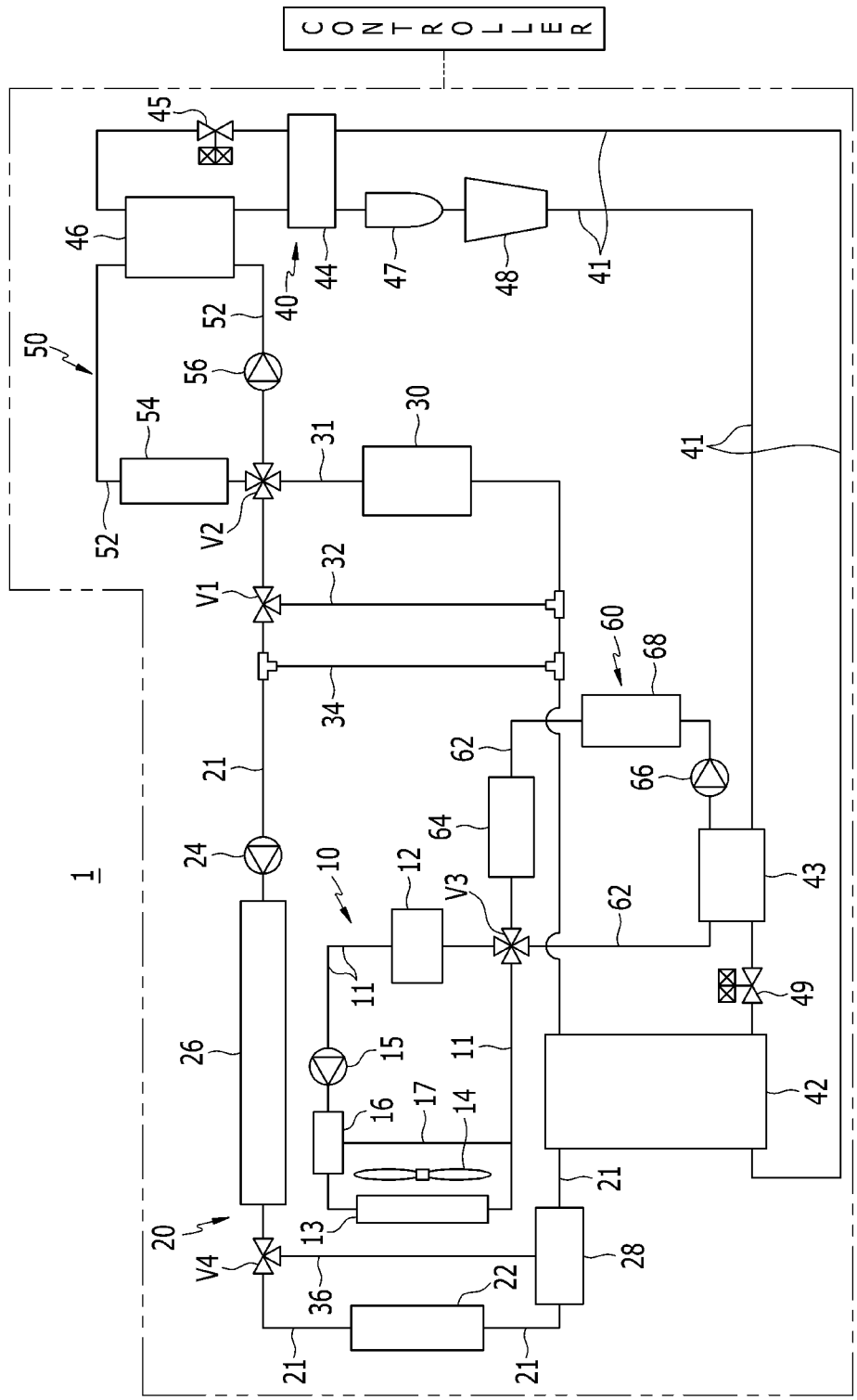
FIG. 1 is a block diagram of a heat pump system for a vehicle according to an exemplary embodiment of the present invention.

1: heat pump system
10: engine cooling device

11: first coolant line
12: engine
13: first radiator
14: cooling fan
15: first water pump
16: thermostat
17: first branch line
20: electrical equipment cooling device
21: second coolant line
22: second radiator
24: second water pump
26: electrical equipment
28: reservoir tank
30: battery module
31: battery coolant line
32, 34, 36: second, third and fourth branch line
40: CE module
41: refrigerant line
42: main heat exchanger
43: sub-condenser
44: internal heat exchanger
45: expansion valve
46: evaporator
47: accumulator
48: compressor
49: sub-expansion valve
50: air conditioner
52: first connection line
54: cooler
56: third water pump
60: heating device
62: second connection line
64: heater
66: fourth water pump
68: internal heater
V1, V2, V3, V4: first, second, third, fourth valve

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings. Although exemplary embodiments have been described with reference to a number of illustrative exemplary embodiments thereof, it should be understood that numerous other modifications and embodiments can be devised by those skilled in the art that will fall within the spirit and scope of the principles of the present invention.

The drawings and description are to be regarded as illustrative in nature and not restrictive, like reference numerals designate like elements throughout the specification. Since the size and the thickness of each configuration shown in drawings are arbitrarily indicated for better understanding and ease of description, the present invention is not limited to shown drawings, and the thickness of layers, films, panels, regions, etc., are exaggerated for clarity. Further, terms such as " . . . unit", " . . . means", " . . . unit", and " . . . member" described in the specification mean a unit of a collective configuration to perform at least one function or operation.

FIG. 1 is a block diagram of a heat pump system for a vehicle according to an exemplary embodiment of the present invention. A heat pump system 1 for a vehicle according to an exemplary embodiment of the present invention selectively exchanges thermal energy generated from a refrigerant in condensation and evaporation with a coolant to perform a cooling mode or a heating mode of the vehicle using a low-temperature or high-temperature coolant. Such a heat pump system 1 may be applied to a hybrid vehicle that uses an engine 12 and driving power of a motor.

Referring to FIG. 1, the heat pump system 1 may include an engine cooling device 10, an electrical equipment cooling device 20, a battery module 30, a centralized energy (CE) module 40, an air conditioner 50, and a heating device 60. First, the engine cooling device 10 may include a first radiator 13 and a first water pump 15 connected via a first coolant line 11, and configured to circulate a coolant to the first coolant line 11 to cool the engine 12. The first radiator 13 may be disposed in a front of the vehicle, and a cooling fan 14 may be disposed at a rear of the vehicle to cool the coolant by operation of the cooling fan 14 and through heat exchange with external air.

In particular, a first branch line 17 may be disposed in the engine cooling device 10. The first branch line 17 may be connected with the first coolant line 11 between the first radiator 13 and the engine 12 via a thermostat 16 disposed in the first coolant line 11 between the first radiator 13 and the first water pump 15. The first branch line 17 may be selectively opened by operation of the thermostat 16 when a temperature of the coolant is increased by absorbing waste heat generated from the engine 12. In particular, the first coolant line 11 connected with the first radiator 13 may be closed by operation of the thermostat 16.

In the present exemplary embodiment, the electrical equipment cooling device 20 may include a second radiator 22 and a second water pump 24 connected with each other via a second coolant line 21, and may be configured to circulate a coolant to the second coolant line 21 to cool electrical equipment 26. In particular, the electrical equipment 26 may include an electric power control unit (EPCU) that includes a motor, an on board charger (OBC), and a motor.

The EPCU may be configured to generate heat during driving, and the OBC may be configured to generate heat when the battery module 30 is charged. Accordingly, when waste heat of the electrical equipment 26 is recovered in the heating mode of the vehicle, heat generated from the EPCU may be recovered, and the heat generated from the OBC may be recovered when the battery module 30 is charged. The second radiator 22 may be disposed in a front of the first radiator 13, and may be configured to cool the coolant through operation of the cooling fan 14 and heat exchange with external air.

The electrical equipment cooling device 20 may be configured to circulate the coolant cooled in the second radiator 22 along the second coolant line 21 by operation of the second water pump 24 to cool the electrical equipment 26 before the equipment is overheated. The battery module 30 may be disposed in a battery coolant line 31 selectively connected with the second coolant line 21 via a first valve V1. In particular, the first valve V1 may selectively connect the second coolant line 21 connected with the electrical equipment 26 and the battery coolant line 31 between the second radiator 22 and the battery module 30.

The battery module 30 may be configured to supply power to the electrical equipment 26, and may be a water cooling type and thus, the battery module 30 may be cooled by a coolant that flows along the coolant line 31. In other words, the battery module 30 may be selectively connected with the electrical equipment 20 through the battery coolant line 31 based on operation of the first valve V1, and may be cooled by the coolant that circulates along the battery coolant line 31.

In the present exemplary embodiment, the air conditioner 50 may be selectively connected with the battery coolant line 31 via the second valve V2. In such an air conditioner 50, a first connection line 52 is provided to cool the interior of the vehicle by forming a selectively independent closed circuit. In addition, the air conditioner 50 may include a cooler 54 and a third water pump 56 disposed in the first connection line 52.

The air conditioner 50 may be configured to cool the cooler 54 using a low-temperature coolant that circulates along the first connection line 52 by the operation of the third water pump 56 and cooled by the CE module 40. Particularly, the cooler 54 may be disposed in an HVAC module (not shown) mounted within the vehicle. Accordingly, air supplied to the interior of the vehicle from the HVAC module may be cooled through heat exchange with the low-temperature coolant while passing through the cooler 54.

In the present exemplary embodiment, the heater heating device 60 may be selectively connected with the first coolant line 11 via a third valve V3. In such a heating device 60, a second connection line 62 may be formed to heat the interior of the vehicle by forming a selectively independent closed circuit. In addition, the heating device 60 may include a heater 64 disposed in the second connection line 62 and a fourth water pump 66. Particularly, the heating device 60 may further include an internal heater 68 disposed in the second connection line 62. The internal heater 68 may be selectively operated to increase a temperature of the coolant when the temperature of the coolant circulating through the second connection line 62 is less than a temperature of the interior of the vehicle. The internal heater 68 may be an electric heater configured to operate based on power supply.

The heating device 60 may be configured to circulate along the second connection line 62 by operation of the fourth water pump 66, and may be configured to heat the heater 64 using a high-temperature coolant heated by the CE module 40. In particular, the heater 64 may be disposed in the HVAC module (not shown) mounted within the vehicle. Accordingly, air supplied to the interior of the vehicle from the HVAC module may be heated through heat exchange with the high-temperature coolant while passing through the heater 64. The cooler 54 and the heater 64 may be water-cooled types configured to cool or heat based on the temperature of the coolant introduced thereinto.

Meanwhile, the second valve V2 may selectively connect the battery coolant line 31 and the first connection line 52 between the battery module 30 and the cooler 54. In addition, the third valve V3 may selectively connect the first coolant line 11 and the second connection line 62 between the engine 12 and the heater 64. The first, second, and third valves V1, V2, and V3 may be configured to adjust a flow direction of the coolant.

Meanwhile, an additional water pump (not shown) may be disposed in the battery coolant line 31 to circulate the coolant along the battery coolant line 31. Particularly, the second and third valves V2 and V3 may be provided as 4-way valves. In addition, the first, second, third, and fourth water pumps 15, 24, 56, and 66 may be electric water pumps.

In the present exemplary embodiment, the centralized energy (CE) module 40 may be connected to the second coolant line 21 and the first and second connection lines 52 and 62 to respectively supply a low-temperature coolant to the air conditioner 50 and a high-temperature coolant to the heating device 60. The CE module 40 may be configured to perform selective heat exchange between thermal energy generated from condensation and evaporation of a refrigerant that circulates in the CE module 40 with the coolant, and the heat-exchanged low-temperature or high-temperature coolant may be supplied to the air conditioner 50 and the heating device 60.

Particularly, the refrigerant may be a high-performing R152-a, R744, or R290 refrigerant. In other words, the low-temperature coolant may be supplied to the cooler 54 through the first connection line 52, and the high-temperature coolant may be supplied to the heater 64 through the second connection line 62. The CE module 40 may include a main heat exchanger 42, an expansion valve 45, an evaporator 46, and a compressor 48. First, the main heat exchanger 42 may be disposed in the second coolant line 21 between the second radiator 22 and the battery module 30. The main heat exchanger 42 may be configured to condense or evaporate the refrigerant.

Accordingly, the main heat exchanger 42 may be configured to condense or evaporate the refrigerant by performing heat exchange with the coolant, and heat energy generated from the condensation or evaporation of the refrigerant may be supplied to the coolant to increase or decrease the temperature of the coolant. The expansion valve 45 may be connected with the main heat exchanger 42 via a refrigerant line 41. The expansion valve 45 may be expanded by receiving a refrigerant having passed through the main heat exchanger 42. The expansion valve 46 may be formed of either a mechanic or electronic type.

Further, the evaporator 46 may be connected with the expansion valve 45 via the refrigerant line 41, and may be disposed in the first connection line 52 to cool the coolant that circulates along the first connection line 52 in the air conditioner 50. The evaporator 46 may be configured to evaporate the refrigerant introduced therein through heat exchange with the coolant, and low-temperature thermal energy generated from evaporation of the refrigerant may be supplied to the coolant to reduce the temperature of the coolant. In addition, the compressor 48 may be disposed in the refrigerant line 41 between the evaporator 46 and the main heat exchanger 42. The compressor 41 may be configured to compress a refrigerant discharged from the evaporator 46 in a gas state.

In addition, an accumulator 47 and an internal heat exchanger 44 may be sequentially disposed in the refrigerant line 41 between the evaporator 46 and the compressor 48. The refrigerant line 41 that connects the main heat exchanger 42 and the expansion valve 45 and the refrigerant line 41 that connects the accumulator 47 and the compressor 48 may be respectively connected to the internal heat exchanger 44. When the main heat exchanger 42 condenses the refrigerant, the internal heat exchanger 44 may be configured to additionally condense the refrigerant condensed by the main heat exchanger 42 through heat exchange with a low-temperature refrigerant discharged from the evaporator 46 and then the additionally condensed refrigerant may be introduced to the expansion valve 45.

The accumulator 47 may be disposed in the refrigerant line 41 between the internal heat exchanger 44 and the compressor 48. The accumulator 47 may be configured to supply a refrigerant only in a gas state to the compressor 48 to thus improve efficiency and durability of the compressor 48. Accordingly, the refrigerant discharged from the evaporator 46 may be supplied to the compressor 48 after exchanging heat with the refrigerant supplied from the main heat exchanger 42 while passing through the internal heat exchanger 44. The condensed refrigerant discharged from the main heat exchanger 32 and the low-temperature refrigerant discharged from the evaporator 46 may be introduced respectively into the internal heat exchanger 44. Accordingly, the internal heat exchanger 44 may be configured to additionally exchange heat between the low-temperature refrigerant and the condensed refrigerant to further decrease a temperature of the refrigerant and increase the amount of condensation. As described, since the internal heat exchanger 44 may be configured to further condense the refrigerant that has been condensed in the main heat exchanger 42, sub-cooling of the refrigerant may be increased, and accordingly, a coefficient of performance, which is a coefficient of cooling performance with respect to power consumption of the compressor, may be improved.

Moreover, the CE module 40 may further include a sub-condenser 43 and a sub-expansion valve 49. First, the sub-condenser 43 may be connected with the compressor 48 between the main heat exchanger 42 and the compressor 48 via the refrigerant line 41, and may be disposed in the second connection line 62 to heat the coolant that circulates along the second connection line 62 in the heating device 60. In addition, the sub-expansion valve 49 may be disposed in the refrigerant line 41 between the sub-condenser 43 and the main heat exchanger 42.

The sub-condenser 43 may be configured to primarily condense a refrigerant discharged from the compressor 48 when the main heat exchanger 42 condenses the refrigerant. Accordingly, the main heat exchanger 42 may be configured to additionally condense the refrigerant condensed in the sub-condenser 43, thereby increasing the amount of condensation of the refrigerant. In particular, the sub-expansion valve 49 may pass the refrigerant to the main heat exchanger 42 without expanding the refrigerant. When the main heat exchanger 42 evaporates the refrigerant, the sub-expansion valve 49 may expand the refrigerant discharged from the sub-condenser 43 and then supply the expanded refrigerant to the main heat exchanger 42.

Furthermore, in the present exemplary embodiment, the evaporated low-temperature refrigerant in the internal heat exchanger 44 and the condensed refrigerant exchange heat with each other, but the present invention is not limited thereto. Some of the refrigerant discharged from the internal heat exchanger 44 may be bypassed and then cooled, and a remaining refrigerant introduced from the internal heat exchanger 44 may be cooled by simultaneously using the cooled refrigerant and the low-temperature refrigerant discharged from the evaporator 46 to increase sub-cooling of the refrigerant. Such a main heat exchanger 42, sub-condenser 43, and evaporator 46 may be water-cooling types of heat exchangers into which a coolant is introduced.

When the expansion valve 45 is an electronic valve, the refrigerant may sequentially pass the sub-condenser 43, the main heat exchanger 42, and the internal heat exchanger 44 and then may be introduced into the evaporator 46. The refrigerant discharged from the evaporator 46 may be discharged to the compressor 48 after passing through the internal heat exchanger 44. In particular, a sensor configured to measure a temperature and a pressure of a refrigerant may be provided separately in the refrigerant line 41 that connects the internal heat exchanger 44 and the compressor 48, and the sensor may be configured to adjust the amount of expansion of the expansion valve 45 by measuring overheat of the refrigerant.

In the present exemplary embodiment, a second branch line 32 may be disposed in the battery coolant line 31 to connect the battery module 30 with the air conditioner 50 via the first valve V1, and closes the connection with the electrical equipment cooling device 20. The first valve V1 may selectively connect the second coolant line 21 and the battery coolant line 31, or selectively connect the battery coolant line 31 and the second branch line 32 to control a flow of the coolant. In other words, when the battery module 30 is cooled using a coolant cooled in the second radiator 22, the first valve V1 may connect the second coolant line 21 connected with the second radiator 22 and the battery coolant line 31, and close the second branch line 32.

In addition, when the battery module 30 is cooled using the coolant, which has heat-exchanged with the refrigerant while circulating through the air conditioner 50, the first valve V1 may open the second branch line 32, and may close connection between the second coolant line 21 and the battery coolant line 31. Particularly, the second valve V2 may be configured to selectively operate to connect the battery coolant line 31 with the first connection line 52. Accordingly, the coolant of a low-temperature that has exchanged heat with the refrigerant in the evaporator 46 may be introduced into the battery module 30 through the first branch line 32 opened by the first valve V1, the first connection line 52 connected by the second valve V2, and the battery coolant line 31, to effectively cool the battery module 30.

In the present exemplary embodiment, the second coolant line 21 may include a third branch line 34 that separates the battery coolant line 31 and the second coolant line 21. The third branch line 34 may be selectively connected to the second coolant line 21 and thus, the electrical equipment cooling device 20 may form an independently closed circuit through the second coolant line 21. In particular, a separate valve may be disposed at a point at which the third branch line 34 crosses the second coolant line 21 and the battery coolant line 31, or on the third branch line 34. The separate valve may include a 3-way valve or a 2-way valve.

Further, a fourth branch line 36 connected with the second coolant line 21 between the second radiator 22 and the second water pump 24 through a fourth valve V4 may be disposed at the second coolant line 21 that connects the electrical equipment 26 with the second radiator 22. The fourth branch line 36 may be selectively opened through operation of the fourth valve V4 when the temperature of the coolant is increased by absorbing waste heat generated from the electrical equipment 26. In particular, the second coolant line 21 connected with the second radiator 22 may be closed by operation of the fourth valve V4.

Moreover, a reservoir tank 28 connected with the fourth branch line 36 may be disposed between the second radiator 22 and the main heat exchanger 42. The reservoir tank 28 may be configured to store a cooled coolant introduced from the second radiator 22. Particularly, the first and fourth valves V1 and V4 may be 3-way valves configured to adjust a flow rate. Further, although the present exemplary embodiment has described that a valve is not included in the third branch line 34, the present invention is not limited thereto. The valve is applicable as necessary for selectively opening the third branch line 34. In other words, the third branch line 34 may be configured to adjust a flow rate of the coolant circulating through operations of the second coolant line 21, the battery coolant line 31, and the second and fourth branch lines 32 and 36, and the second and third water pumps 24 and 56 selectively connected with each other based on each mode of the vehicle (e.g., heating, cooling, dehumidification) to adjust opening of the third branch line 34.

Hereinafter, an operation in each mode of the heat pump system 1 for a vehicle according to an exemplary embodiment of the present invention configured as above will be described with reference to FIG. 2 to FIG. 8. The operations described herein below may be executed by a controller.

Figure 2:
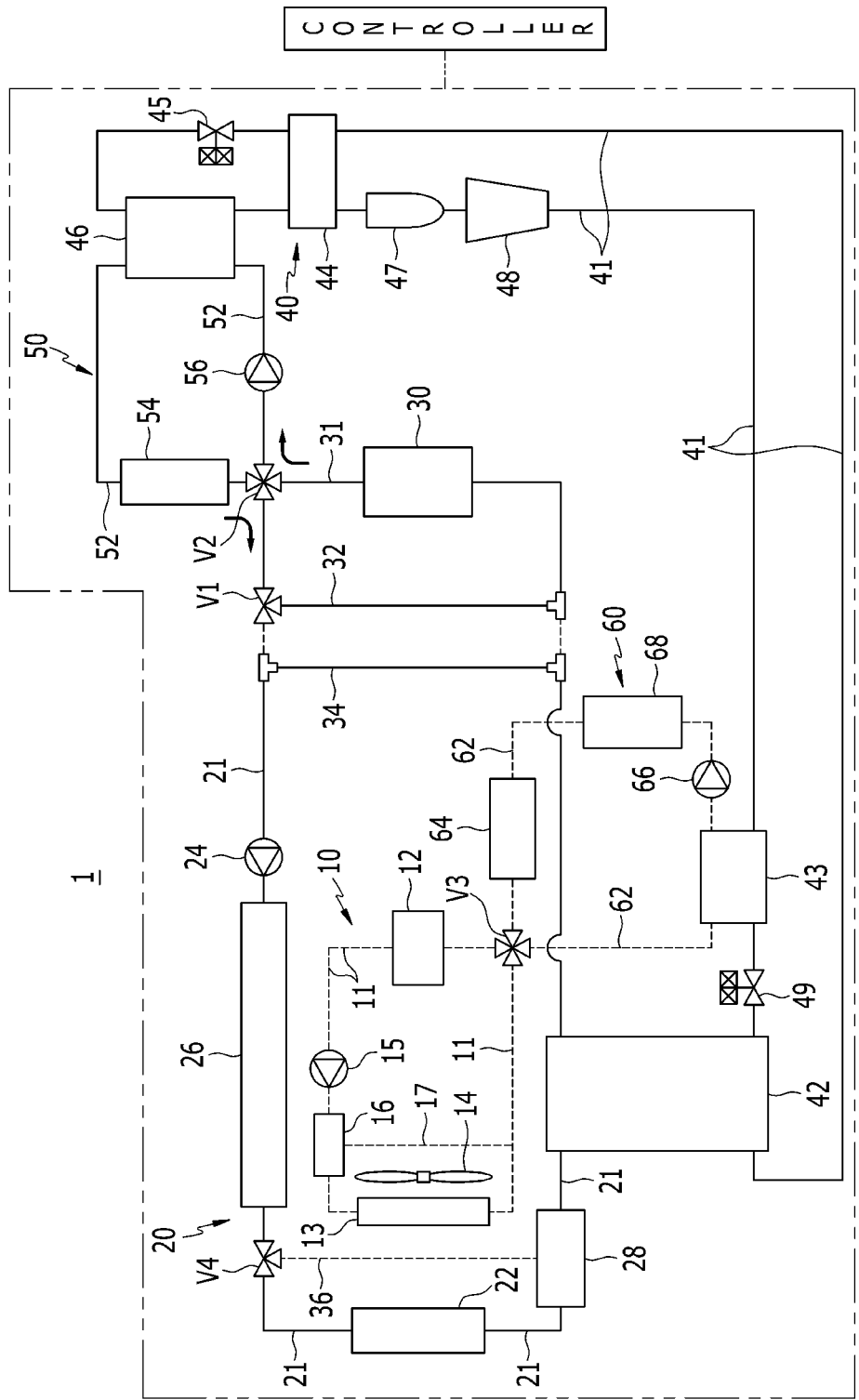
FIG. 2 is a state view of operation for cooling electrical equipment and a battery module in a cooling mode of a vehicle in the heat pump system for a vehicle according to the exemplary embodiment of the present invention.

First, an operation of cooling the battery module 30 together with the electrical equipment 26 in a cooling mode of the vehicle is described with reference to FIG. 2. FIG. 2 is an operating state diagram illustrating an operation of cooling the cooling electrical equipment and the battery module in the cooling mode of the vehicle in the heat pump system for the vehicle according to an exemplary embodiment of the present invention. Referring to FIG. 2, the electrical equipment cooling device 20 operates to cool the electrical equipment 26. Each constituent element of the CE module 40 operates to cool the interior of the vehicle, and the refrigerant circulates along the refrigerant line 41. In addition, operation of the engine cooling device 10 may be stopped.

Particularly, the second branch line 32 may be opened by operation of the first valve V1. Further, the third branch line 34 is opened. In addition, the connection of the second coolant line 21 with the battery coolant line 31 may be closed by operation of the opened second and third branch lines 32 and 34 and the first valve V1. The battery coolant line 21 connected with the battery module 30 may be connected with the first connection line 52 by operation of the second valve V2. In the heating device 60, the fourth water pump 66 may be configured to stop operating, and thus, flow of the coolant is stopped in the second connection line 62.

The main heat exchanger 42 of the CE module 40 may be configured to condense the refrigerant using the coolant introduced along the second coolant line 21. In addition, the sub-condenser 43 and the sub-expansion valve 49 stop operating as the operation of the heating device 60 is stopped. The fourth branch line 36 may be closed by operation of the fourth valve V4. Simultaneously, the fourth valve V4 may open the second coolant line 21 that connects the electrical equipment 26 and the second radiator 22. Accordingly, the coolant cooled in the second radiator 22 may circulate along the second coolant line 21 connected with the third branch line 34 opened by operation of the second water pump 24.

In other words, in the electrical equipment cooling device 20, the opened third branch line 34 may be connected with the second coolant line 21 to allow an independent closed circuit to be formed. Then, the coolant cooled in the second radiator 22 may cool the electrical equipment 26 while circulating by operation of the second water pump 24. The coolant in the battery coolant line 31 may circulate along the battery coolant line 31, the second branch line 32, and the first connection line 52 by operation of the third water pump 56. In other words, the coolant circulating along the battery coolant line 31 may be introduced to the first connection line 52 by operation of the second valve V2 and the third water pump 56. Accordingly, the coolant may circulate along the battery coolant line 31 and the first connection line 52.

In addition, the internal heat exchanger 44 may be configured to additionally condense the refrigerant condensed from the main heat exchanger 42 by heat-exchanging the refrigerant with a refrigerant of a low temperature exhausted from the evaporation 46 to further increase a condensation amount through increase of sub-cooling of the refrigerant to thus increase a condensation amount of the refrigerant. Further, the evaporator 46 heat-exchanges the coolant circulating from the battery coolant line 31 through the first connection line 52 with a refrigerant of a low temperature evaporated inside by an operation of the second valve V2.

The coolant of a low temperature having passed through the evaporator 46 may be supplied to the cooler 54 through the first connection line 52 by an operation of the third water pump 56. In other words, the refrigerant circulating through the refrigerant line 41 in the CE module 40 may be heat-exchanged with the coolant having passed through the main heat exchanger 42 to be primarily condensed. The refrigerant exhausted from the main heat exchanger 42 may then be further heat-exchanged with a refrigerant of a low temperature from the evaporator 46 in the internal heat exchanger 44 to further increase a condensation amount.

The coolant having an increased condensation amount may be expanded by the expansion valve 45, and may be evaporated by the evaporator 46. In particular, the refrigerant evaporated from the evaporator 46 cools the coolant introduced through the first connection line 52. The refrigerant having a condensation amount that increases while sequentially passing through the main heat exchanger 42 and the internal heat exchanger 44 may be expanded and then supplied to the evaporator 46 and thus, the refrigerant may be evaporated at a lower temperature. In the present exemplary embodiment, the internal heat exchanger 44 be configured to additionally condense the refrigerant such that sub-cooling of the refrigerant becomes more advantageous. In addition, since the refrigerant of which the sub-cooling is performed may be evaporated at a lower temperature in the evaporator 46, a temperature of the coolant that is heat-exchanged in the evaporator 46 may be further reduced, thereby improving air conditioning performance and efficiency.

Meanwhile, the refrigerant evaporated in the evaporator 46 may cool the coolant introduced through the first connection line 52. Accordingly, the coolant may be cooled at a low temperature while passing through the evaporator 46, and then may be supplied to the cooler 54 through the first connection line 52. Further, external air introduced into the HVAC module (not shown in the drawing) may be cooled while heat-exchanging with the low-temperature coolant introduced to the cooler 54. After that, the cooled external air may be directly introduced into the vehicle to thus cool the interior of the vehicle. Meanwhile, the low-temperature coolant having passed through the cooler 54 may be introduced into the battery module 30 while flowing along the battery coolant line 31 connected by operation of the second valve V2. Accordingly, the battery module 30 may be effectively cooled by the low-temperature coolant supplied through the battery coolant line 31.

Figure 3:
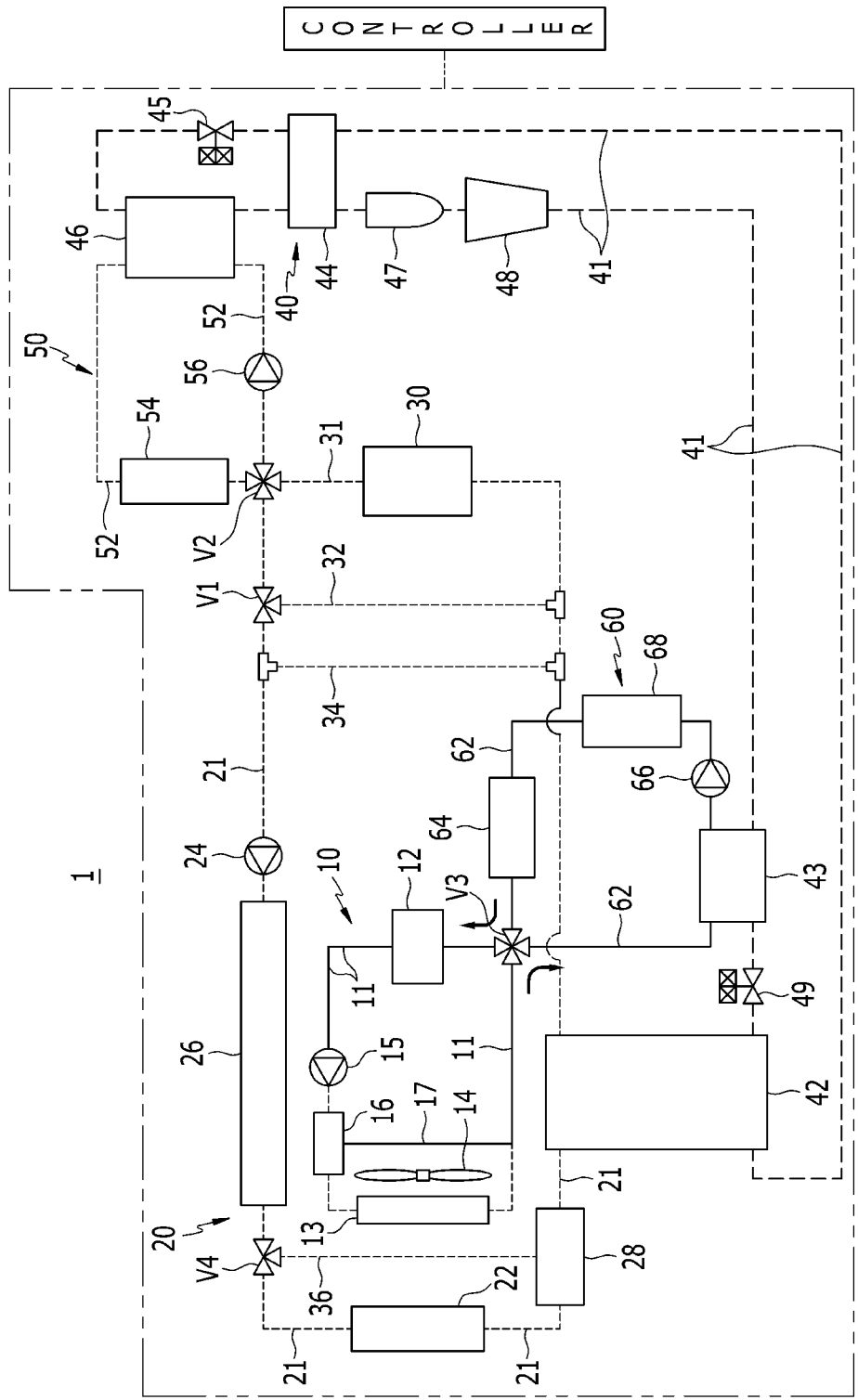
FIG. 3 is a state view of operation for performing a heating mode of the vehicle using an engine cooling device in the heat pump system for the vehicle according to the exemplary embodiment of the present invention.

An operation for performing a heating mode of the vehicle using the engine cooling device 10 will be described with reference to FIG. 3. FIG. 3 is an operation state diagram illustrating a heating mode of the vehicle executed using the engine air conditioning device in the heat pump system of the vehicle according to the exemplary embodiment of the present invention. Referring to FIG. 3, the operation of the second water pump 24 in the electrical equipment cooling device 20 is stopped. Accordingly, circulation of the coolant in the electrical equipment cooling device 20 is stopped. In addition, the CE module 40 stop operating, and thus circulation of the refrigerant is stopped.

Particularly, the first branch line 17 may be opened by operation of the thermostat 16. The second connection line 62 may be connected with the first coolant line 11 by operation of the third valve V3. In addition, the first coolant line 11 that connects the thermostat 16 and the first radiator 13 may be closed while the thermostat 16 opens the first branch line 17. In the air conditioner 50, the third water pump 56 may be configured to stop operating and thus, the flow of the coolant is stopped in the first connection line 52. Accordingly, the coolant of which the temperature is increased while cooling the engine 12 may be supplied to the second connection line 62 through the third valve V3 while circulating along the first coolant line 11 and the first branch line 17.

A high-temperature coolant circulating along the second connection line 62 may then be supplied from the first coolant line 11 by operation of the fourth water pump 66 in the heating device 60. Accordingly, the external air introduced to the HVAC module (not shown) may be heated while passing through the heater 64 to which the high-temperature coolant is introduced, and then may be introduced into the vehicle while being in a high-temperature state to thus heat the interior of the vehicle.

Moreover, the internal heater 68 disposed in the second connection line 62 may start to operate to increase a temperature of coolant supplied to the heater 64 when the temperature of the coolant is less than a set temperature. In other words, the heat pump system 1 according to the present exemplary embodiment uses waste heat generated from the engine 12 to increase a temperature of a coolant supplied to the heater 64 when the heating mode of the vehicle is executed using the engine cooling device 10 to thus improve heating efficiency.

Figure 4:
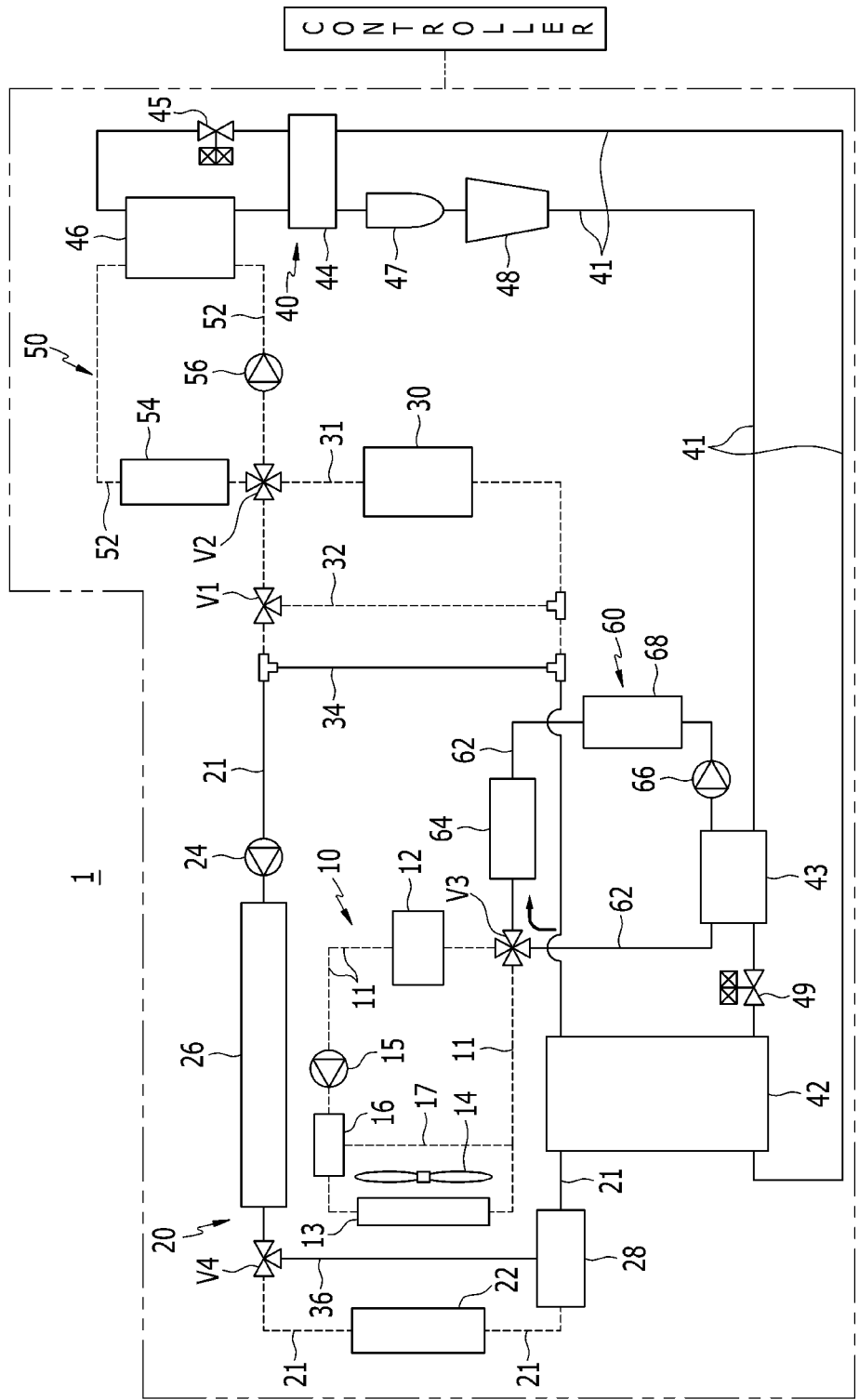
FIG. 4 is a state view of operation for performing a heating mode of the vehicle using an electrical equipment cooling device in the heat pump system for the vehicle according to the exemplary embodiment of the present invention.

An operation when executing the heating mode of the vehicle using the electrical equipment cooling device 20 will now be described with reference to FIG. 4. FIG. 4 is an operating state diagram illustrating the heating mode of the vehicle executed using the electrical equipment cooling device in the heat pump system for the vehicle according to the exemplary embodiment of the present invention. Referring to FIG. 4, the first water pump 15 stops operating in the engine cooling device 10. Accordingly, circulation of the coolant in the engine cooling device 20 is stopped. Each constituent element of the CE module 40 operates to heat the interior of the vehicle, and the refrigerant circulates along the refrigerant line 41.

In particular, the second branch line 32 may be closed by operation of the first valve V1, and the third branch line 34 is opened. Accordingly, the connection between the second coolant line 21 and the battery coolant line 31 may be closed. In addition, the fourth branch line 36 may be opened by operation of the fourth valve V4 in the electrical equipment cooling device 20. Further, the fourth valve V4 may close the second coolant line 21 that connects the electrical equipment 26 and the second radiator 21. Then, a temperature of the coolant circulating in the second coolant line 21 in a state of not passing through the second radiator 22 may be increased while cooling the electrical equipment 26.

The third valve V3 may close the connection between the first coolant line 11 and the second connection line 62 to allow the second connection line 62 to form an independent closed circuit. The coolant may circulate along the second connection line 62 by operation of the fourth water pump 66 in the heating device 60. In the air conditioner 50, operation of the third water pump 56 may be stopped, and thus, the flow of the coolant is stopped in the first connection line 52. Accordingly, operations of the expansion valve 45 and the evaporator 46 stop as the operation of the air conditioner 50 stops.

Further, a temperature of the coolant circulating along the second connection line 62 in the heating device 60 may be increased through heat-exchange with a high-temperature refrigerant supplied to the sub-condenser 43 from the compressor 48. The high-temperature coolant having passed through the sub-condenser 43 may be supplied to the heater 64 along the second connection line 62 by operation of the fourth water pump 66. In particular, waste heat generated from the electrical equipment 26 increases the temperature of the coolant that circulates along the second coolant line 21.

The coolant of which the temperature is increased may pass through the main heat exchanger 42 by operation of the second water pump 24 and thus may be recovered while increasing a temperature of the refrigerant discharged from the main heat exchanger 42. A refrigerant condensed while passing through the sub-condenser 43 by operation of the sub-expansion valve 49 may be supplied in an expanded state to the main heat exchanger 42. In other words, the main heat exchanger 42 may be configured to evaporate the refrigerant. Accordingly, the refrigerant of which the temperature is increased while passing through the main heat exchanger 42 may pass through the internal heat exchanger 44 and the expansion valve 45 along the refrigerant line 41 and thus may be introduced into the compressor 48. In particular, the expansion valve 45 may be configured to supply the refrigerant to the compressor 48 without expanding the refrigerant. In other words, the refrigerant of which the temperature is increased may be introduced to the compressor 48, and may be compressed at a higher temperature with a higher pressure in the compressor 48 and then may be introduced to the sub-condenser 43.

Moreover, the coolant circulating through the second connection line 62 may pass through the sub-condenser 43 to heat-exchange with the refrigerant of the high temperature to supply the coolant having an increased temperature to the heater 64. Accordingly, external air introduced into the HVAC module (not shown) may be heated while passing through the heater 64 into which the coolant of a high temperature is introduced, and the external air having an increased temperature may be introduced into the vehicle to thus heat the interior of the vehicle. In other words, the heat pump system 1 according to the present exemplary embodiment may use waste heat generated from the electrical equipment 26 in a heating mode of the vehicle to increase a temperature of the refrigerant, thereby reducing power consumption of the compressor 48, and improving the heating efficiency.

Although not illustrated in FIG. 4, when the heating mode of the vehicle is executed by recovering waste heat of the battery module 30 together with the waste heat generated from the electrical equipment 26, the second coolant line 21 and the battery coolant line 31 may be connected with each other through the first valve V1 and the second valve V2 and the second branch line 32 may be closed. In addition, since the second coolant line 21 and the battery coolant line 31 may be connected with each other, the third branch line 34 may also be closed.

Then, the waste heats generated from the electrical equipment 26 and the battery module 30 may be recovered while the coolant circulates along the second coolant line 21, the fourth branch line 36, and the battery coolant line 31 by operation of the second water pump 24 and, thus the temperature of the coolant increases. The coolant of which the temperature is increased may increase a temperature of the refrigerant through heat-exchange with the refrigerant while passing through the internal heat exchanger 44.

Figure 5:
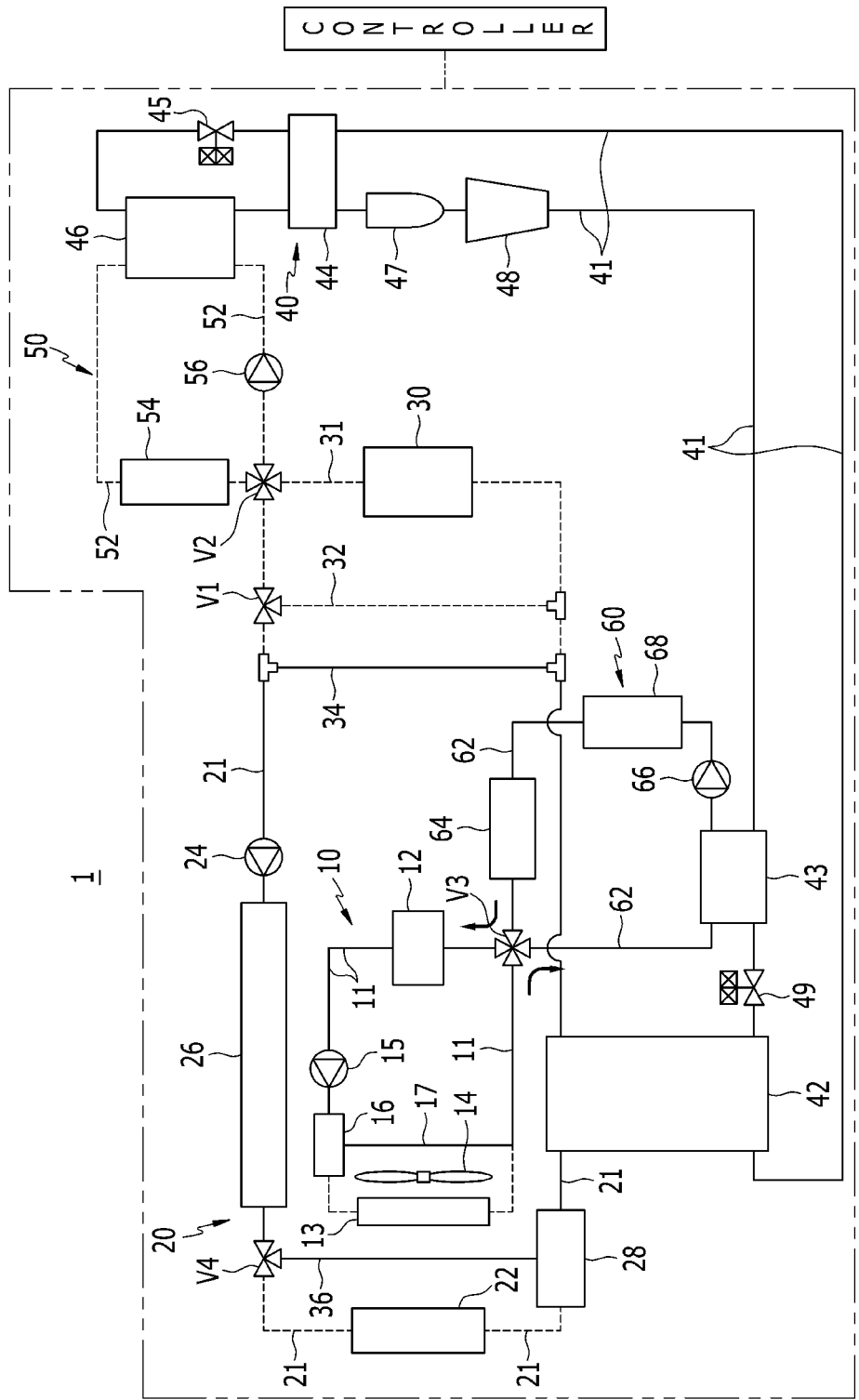
FIG. 5 is a state view of operation for performing a heating mode of the vehicle using an engine cooling device and an electrical equipment cooling device in the heat pump system for the vehicle according to the exemplary embodiment of the present invention.

Hereinafter, executing the heating mode of the vehicle using the engine cooling device 10 and the electrical equipment cooling device 20 will be described with reference to FIG. 5. FIG. 5 is an operating state diagram illustrating the heating mode of the vehicle executed using the engine cooling device and the electrical equipment cooling device in the heat pump system for the vehicle according to the exemplary embodiment of the present invention. Referring to FIG. 5, the first branch line 17 may be opened by operation of the thermostat 16. The second connection line 62 may be connected with the first coolant line 11 by operation of the third valve V3.

In addition, the thermostat 17 may be in the open state, and the first coolant line 11 that connects the thermostat 16 and the first radiator 13 may be closed. The second branch line 32 may be closed by operation of the first valve V1, and the third branch line 34 may be opened. Accordingly, the connection between the second coolant line 21 and the battery coolant line 31 may be closed. In addition, the fourth branch line 36 may be opened by operation of the fourth valve V4 in the electrical equipment cooling device 20. In addition, the fourth valve V4 may close the second coolant line 21 that connects the electrical equipment 26 and the second radiator 22. Accordingly, the temperature of the coolants respectively circulating in the first and second coolant lines 11 and 21 may be increased while continuously cooling the engine 12 and the electrical equipment 26 without passing through the first and second radiators 13 and 22, respectively.

The coolant of which the temperature is increased while cooling the engine 12 may be supplied to the second connection line 62 through the third valve V3 while circulating along the first coolant line 11 and the first branch line 17. Then, a high-temperature coolant that circulates along the second connection line 62 may be supplied to the heater 64 from the first coolant line 11 by operation of the fourth water pump 66. Each constituent element of the CE module 40 operates to heat the interior of the vehicle, and the refrigerant circulates along the refrigerant line 41.

Meanwhile, in the air conditioner 50, operation of the third water pump 56 may be configured to stop and thus, the flow of the coolant is stopped in the first connection line 52. Accordingly, the expansion valve 45 and the evaporator 46 stop operating as the air conditioner 50 stops operating. A temperature of a high-temperature coolant supplied to the second connection line 62 from the first coolant line 11 may thus be further increased through heat-exchange with the high-temperature refrigerant supplied to the sub-condenser 43 from the compressor 48 by operation of the third valve V3 in the heating device 60.

The high-temperature coolant having passed through the sub-condenser 43 may be supplied to the heater 64 along the second connection line 62 by operation of the fourth water pump 66. In other words, the waste heat generated from the engine 12 increases a temperature of the coolant that circulates along the first coolant line 11. In addition, the waste heat generated from the electrical equipment 26 increases a temperature of the coolant that circulates along the second coolant line 21.

The coolant of which the temperature is increased in the second coolant line 21 may be recovered while increasing a temperature of the refrigerant discharged from the main heat exchanger 42 while passing through the main heat exchanger 42 by operation of the second water pump 24. In particular, the refrigerant condensed while passing through the sub-condenser 43 may be supplied in an expanded state to the main heat exchanger 42 by operation of the sub-expansion valve 49. In other words, the main heat exchanger 42 may be configured to evaporate the refrigerant. Accordingly, the refrigerant of which the temperature is increased while passing through the main heat exchanger 42 may pass through the internal heat exchanger 44 and the expansion valve 45 along the refrigerant line 41 and then may be introduced into the compressor 48. In particular, the expansion valve 45 may be configured to supply the refrigerant without expanding the refrigerant to the compressor 48.

In other words, the refrigerant of which the temperature is increased may be introduced into the compressor 48, and may be compressed at a higher temperature and a higher pressure in the compressor 48 and then may be introduced to the sub-condenser 43. Meanwhile, a temperature of the coolant circulating along the second connection line 62 may be further increased through heat-exchange with the high-temperature refrigerant while passing through the sub-condenser 43 and then the coolant of which the temperature is further increased may be supplied to the heater 64.

Accordingly, external air introduced into the HVAC module (not shown) may be heated while passing through the heater 64 into which the coolant of a high temperature is introduced, and the external air having an increased temperature may be introduced into the vehicle and thus, the interior of the vehicle may be heated. The heat pump system 1 according to the present exemplary embodiment may use waste heat generated from the electrical equipment 26 and the engine 12 in a heating mode of the vehicle to increase a temperature of the refrigerant, thereby reducing power consumption of the compressor 48, and improving the heating efficiency. When a temperature of the coolant supplied to the heater 64 is less than a set temperature, the internal heater 68 disposed in the second connection line 62 may operate to increase the temperature of the coolant.

Figure 6:
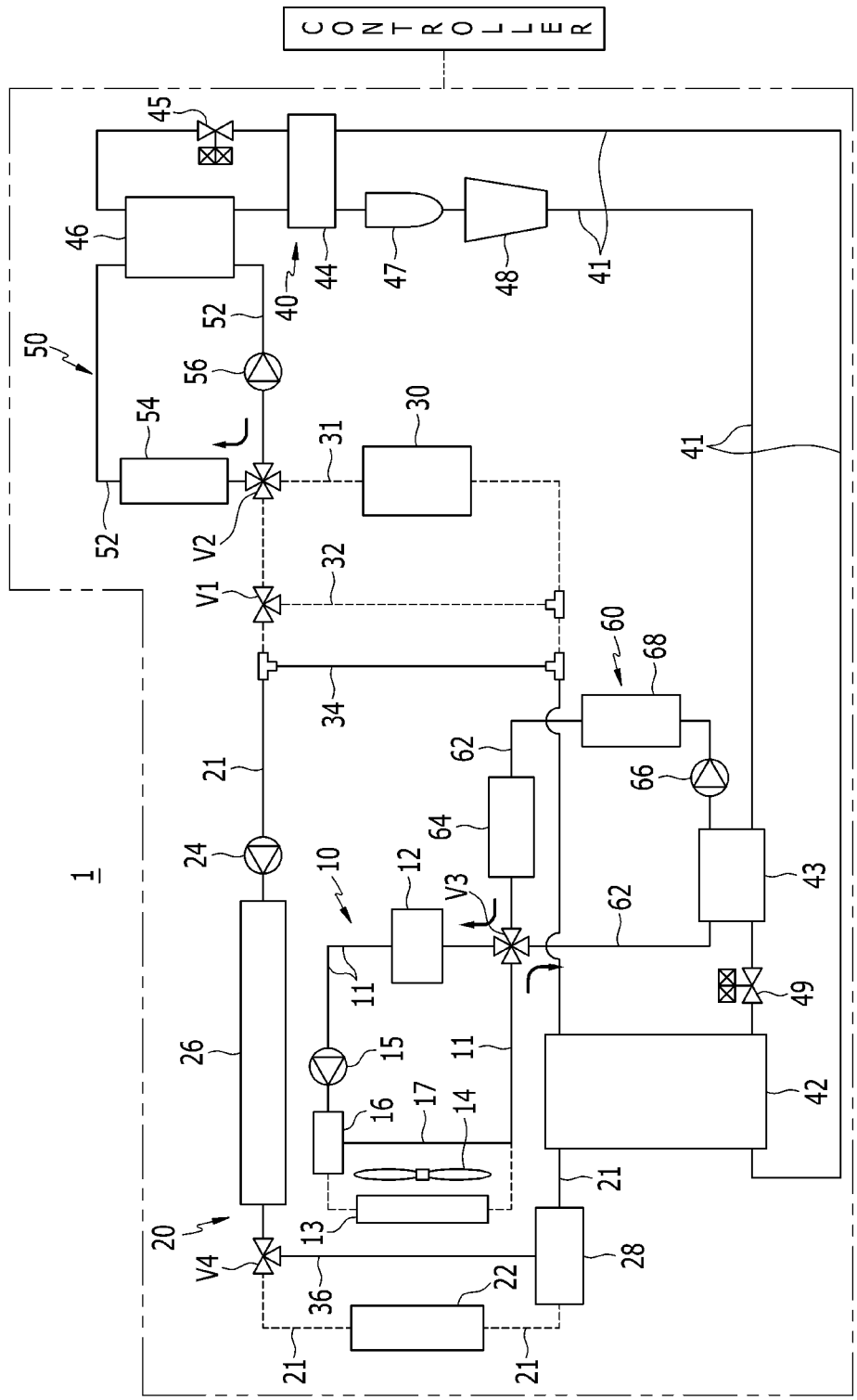
FIG. 6 is an operation state view according to a dehumidifying mode of the vehicle in the heat pump system for the vehicle according to the exemplary embodiment of the present invention.

In the present exemplary embodiment, operation in a dehumidifying mode of the vehicle will be described with reference to FIG. 6. FIG. 6 is operation state diagram illustrating the dehumidifying mode of the vehicle in the heat pump system for the vehicle according to the exemplary embodiment of the present invention. Referring to FIG. 6, in the dehumidifying mode of the vehicle, the engine cooling device 10 and the electrical equipment cooling device 20 respectively operate by operations of the first and second water pumps 15 and 24, respectively.

In addition, each constituent element of the CE module 40 operates to cool the interior of the vehicle, and the refrigerant circulates along the refrigerant line 41. Particularly, the first branch line 17 may be opened by operation of the thermostat 16. The second connection line 62 may be connected with the first coolant line 11 by operation of the third valve V3. In addition, while the first branch line 17 is in the open state, the first coolant line 11 that connects the thermostat 16 and the first radiator 13 may be closed.

Further, the second branch line 32 may be closed by operation of the first valve V1, and the third branch line 34 may be opened. Accordingly, the connection between the second coolant line 21 and the battery coolant line 31 may be closed. In addition, the fourth branch line 36 may be opened by operation of the fourth valve V4 in the electrical equipment cooling device 20. Further, the fourth valve V4 may close the second coolant line 21 that connects the electrical equipment 26 and the second radiator 21. Accordingly, the coolant circulating in the first and second coolant lines 11 and 21 may continuously cool the engine 12 and the electrical equipment 26 without passing through the first and second radiators 13 and 22 and thus, the temperature of the coolant may be increased.

The coolant of which the temperature is increased while cooling the engine 12 may circulate along the first coolant line 11 and the first branch line 17 to be supplied to the second connection line 62 through the third valve V3. Then, a high-temperature coolant that circulates along the second connection line 62 may be supplied to the heater 64 from the first coolant line 11 by operation of the fourth water pump 66. In particular, in the air conditioner 50, the first connection line 52 may form an independent closed circuit by operation of the second valve V2. Accordingly, in the air conditioner 50, the coolant may circulate along the first connection line 52 by operation of the third water pump 56. In other words, the second coolant line 31 and the first connection line 52 may respectively form the independent closed circuits by operation of the first and second valves V1 and V2.

Meanwhile, the main heat exchanger 42 of the CE module 40 may be configured to condense the refrigerant using the coolant that flows along the coolant line 11. Simultaneously, the sub-condenser 43 may be configured to increase the temperature of the coolant that circulates along the second connection line 62 from the battery coolant line 21 by operation of the fourth valve V4 through heat-exchange with a high-temperature refrigerant discharged from the compressor 48. Simultaneously, the sub-condenser 43 may be configured to primarily condense the refrigerant through the heat-exchange with the coolant and then supply the condensed refrigerant to the main heat exchanger 42. In addition, the sub-expansion valve 49 may be configured to supply the refrigerant to the main heat exchanger 42 without expanding the refrigerant.

The main heat exchanger 42 may be configured to additionally condense the condensed refrigerant, which has passed through the sub-condenser 43 through heat-exchange with the coolant that circulates along the coolant line 11, to increase a condensation amount of the refrigerant. In addition, the internal heat exchanger 44 may be configured to additionally condense the refrigerant condensed from the main heat exchanger 42 by heat-exchanging the refrigerant with a refrigerant of a low temperature exhausted from the evaporator 46 to further increase a condensation amount through increase of sub-cooling of the refrigerant to thus increase a condensation amount of the refrigerant.

Further, the evaporator 46 may be configured to heat-exchange the coolant circulating along the first connection line 52 by operation of the second valve V2 and operation of the third water pump 56 with a low-temperature refrigerant that has been evaporated in the evaporator 46. The low-temperature coolant having passed through the evaporator 46 may be supplied to the cooler 54 along the first connection line 52 by operation of the third water pump 56. In other words, the refrigerant that circulates along the refrigerant line 41 in the CE module 40 may be condensed by heat-exchanging with the coolant of the second connection line 62, passing through the sub-condenser 43. Then, the condensed refrigerant may be additionally condensed by heat-exchanging with the coolant of the second coolant line 21, passing through the main heat exchanger 42.

Further, the internal heat exchanger 44 may be configured to additionally condense a refrigerant at a middle temperature, discharged from the main heat exchanger 42 with a low-temperature refrigerant discharged from the evaporator 47, to increase a condensation amount through an increase of sub-cooling of the refrigerant. The coolant having an increased condensation amount may be expanded by the expansion valve 45, and may be evaporated by the evaporator 46. In particular, the refrigerant evaporated from the evaporator 46 may cool the coolant introduced through the first connection line 52. The refrigerant of which a condensation amount is increased while sequentially passing through the main heat exchanger 42 and the internal heat exchanger 44 may be expanded and then supplied to the evaporator 46 to thus, evaporate the refrigerant at a lower temperature. In other words, in the present exemplary embodiment, the internal heat exchanger 44 may be configured to additionally condense the refrigerant such that sub-cooling formation of the refrigerant becomes advantageous.

Moreover, the coolant evaporated in the evaporator 46 may cool the coolant introduced through the first connection line 52. Accordingly, the coolant may be cooled at a low temperature while passing through the evaporator 46, and then may be supplied to the cooler 54 through the first connection line 52. In addition, the coolant circulating along the second connection line 62 in the heating device 60 may exchange heat with a high-temperature refrigerant supplied from the compressor 48 in the sub-condenser 43 to thus increase a temperature of the coolant.

The high-temperature coolant having passed through the sub-condenser 43 may be supplied to the heater 64 along the second connection line 62 by operation of the fourth water pump 66. In this state, an opening door of the HVAC module (not shown) may be open to pass the external air through both of the cooler 54 and the heater 64. Accordingly, the external air introduced into the HVAC module may pass through the cooler 54 into which the coolant of a low temperature is introduced and the heater 64 into which the coolant of a high temperature is introduced to be dehumidified, and the dehumidified external air may be introduced into the vehicle to dehumidify the interior of the vehicle.

As described above, the heat pump system 1 for a vehicle according to an exemplary embodiment of the present invention may be simplified and a layout of connection pipes in which a coolant circulates may be simplified by selectively heat-exchanging heat energy generated from a coolant with a coolant upon condensation and evaporation of the coolant to adjust an internal temperature of the vehicle using the heat-exchanged coolant of a low temperature or a high temperature.

In addition, heating efficiency of the vehicle may be improved by using the waste heat of the engine 12 and the waste heat of the electrical equipment 25, and the battery module 30 may effectively adjust a temperature to achieve optimal performance of the battery module 30 to thus increase the travel distance of the vehicle. In addition, according to the exemplary embodiment of the present invention, the CE module 40 that generates heat energy through condensation and evaporation of the coolant may be packaged to reduce size and weight thereof.

In addition, noise, vibration, and operational instability may be prevented from being generated since a high performance R152-a, R744, or R290 refrigerant is used in the CE module 40 as compared with an air conditioner according to the related art. Furthermore, sub-cooling of a refrigerant may be increased to improve cooling performance and efficiency by configuring the sub-condenser 43 and the internal heat exchanger 44 together to increase a condensation amount of the refrigerant in the CE module 40. In addition, the present invention may reduce a manufacturing cost and a weight, and may improve space utilization by simplifying the entire system.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A heat pump system for a vehicle, comprising:
   an engine cooling device that includes a first radiator and a first water pump that are connected via a first coolant line, wherein the engine cooling device is configured to circulate a coolant in an engine, wherein the first coolant line extends from the engine to the first water pump and the first radiator;
   an electrical equipment cooling device that includes a second radiator and a second water pump that are connected via a second coolant line, wherein the electrical equipment cooling device is configured to circulate the coolant in the second coolant line, wherein the second coolant line extends from the second radiator to the second water pump via a fourth valve and to a main heat exchanger;
   a battery module disposed in a battery coolant line that is selectively connected with the second coolant line by a first valve;
   an air conditioner connected with the battery coolant line via a second valve, in which a first connection line is formed to cool the interior of the vehicle by selectively forming an independent closed circuit, and the first connection line extends from an evaporator to a third water pump and a cooler and from the third water pump to the second valve;
   a heating device connected with the first coolant line via a third valve, in which a second connection line is formed to heat the interior of the vehicle by selectively forming an independent closed circuit, and the second connection line extends from the heating device to a fourth water pump and a heater and from the fourth water pump to the third valve via a sub-condenser; and
   a centralized energy (CE) module configured to supply a low-temperature coolant to the air conditioner, connected with the second coolant line, the first connection line, and the second connection line to supply a high-temperature coolant to the heating device, and selectively heat-exchanges heat energy generated from condensation and evaporation of a refrigerant that circulates inside with the coolant,
   wherein the CE module includes:
     the main heat exchanger disposed in the second coolant line between the second radiator and the battery module, and configured to evaporate or condense a refrigerant;
     an expansion valve connected with the main heat exchanger via a refrigerant line;
     the evaporator connected with the expansion valve via the refrigerant line, and disposed in the first connection line to cool a coolant that circulates along the first connection line in the air conditioner;
     a compressor disposed in the refrigerant line between the evaporator and the main heat exchanger,
     the sub-condenser connected with the refrigerant line between the main heat exchanger and the compressor, and disposed in the second connection line to heat a coolant that circulates along the second connection line in the heating device; and
     a sub-expansion valve disposed in the refrigerant line between the sub-condenser and the main heat exchanger,
   wherein the heat pump system further includes:
     a first branch line provided in the engine cooling device and connected with the first coolant line between the first radiator and the engine via a thermostat disposed in the first coolant line between the first radiator and the first water pump,
     a second branch line provided in the battery coolant line and that connects the battery module with the air conditioner via the first valve and closes connection with the electrical equipment cooling device,
     a third branch line is provided in the second coolant line and separates the battery coolant line and the second coolant line; and
     a fourth branch line provided in the second coolant line that connects electrical equipment, wherein the fourth branch line is connected with the second coolant line between the second radiator and the second water pump via the fourth valve,
   wherein when a heating mode of the vehicle is executed using the engine cooling device,
     the first branch line is opened by operation of the thermostat, the first coolant line and the second connection line are connected by operation of the third valve, and the first coolant line that connects the thermostat and the first radiator is closed,
     a coolant having a temperature that increases while passing through the engine is supplied to the second connection line through the third valve while circulating along the first coolant line and the first branch line, in the heating device, a high-temperature coolant that circulates along the second connection line is supplied to the heater from the first coolant line by operation of the fourth water pump, and circulation of the refrigeration stops in the CE module, wherein waste heat generated from the engine increases the temperature of the coolant supplied to the heater when the heating mode of the vehicle is executed using the engine cooling device to improve heating efficiency, and wherein the system further includes a controller configured to:

operate the first valve to open the second branch line and the third branch line to close the connection at the second coolant line with the battery coolant line;

operate the second valve to connect the battery coolant line with the first connection line; and operate the fourth value to close the fourth branch line and simultaneously open the second coolant line that connects the electrical equipment and the second radiator.

2. The heat pump system for the vehicle of claim 1, wherein the electrical equipment cooling device is configured to cool electrical equipment or cool the battery module using a coolant that circulates along the second coolant line.

3. The heat pump system for the vehicle of claim 1, wherein an internal heat exchanger is disposed in the refrigerant line between the evaporator and the compressor.

4. The heat pump system for the vehicle of claim 3, wherein the internal heat exchanger is connected with the refrigerant line that connects the main heat exchanger and the expansion valve, and the refrigerant line that connects the evaporator and the compressor, and when the main heat exchanger condenses a refrigerant, the internal heat exchanger additionally condenses the refrigerant condensed in the main heat exchanger through heat-exchange with a low-temperature refrigerant discharged from the evaporator, and introduces the additionally condensed refrigerant to the expansion valve.

5. The heat pump system for the vehicle of claim 1, wherein the first valve selectively connects the second coolant line and the battery coolant line between the second radiator and the battery module, the second valve selectively connects the battery coolant line and the first connection line, and the third valve selectively connects the first coolant line and the second connection line to control flow of the coolant.

6. The heat pump system for the vehicle of claim 1, wherein, when the battery module is cooled together with the electrical equipment in a cooling mode of the vehicle, the second branch line is opened by operation of the first valve, the third branch line is opened, and the connection between the second coolant line and the battery coolant line is closed by the opened second and third branch lines, the battery coolant line connected with the battery module is connected with the first connection line by operation of the second valve, the fourth branch line is closed by operation of the fourth valve, and a refrigerant is circulated, the main heat exchanger condenses the refrigerant, and the sub-condenser and the sub-expansion valve stop operation in the CE module.

7. The heat pump system for the vehicle of claim 6, wherein the evaporator cools a coolant that circulates into the first connection line from the battery coolant line by operation of the second valve with heat-exchange with a low-temperature evaporated refrigerant, a low-temperature coolant having passed through the evaporator is supplied to the cooler along the first connection line by operation of the third water pump, and the low-temperature coolant having passed through the cooler is supplied to the battery module along the battery coolant line that is connected with the first connection line by operation of the second valve to cool the battery module.

8. The heat pump system for the vehicle of claim 6, wherein, in the electrical equipment cooling device, the opened third branch line is connected to the second coolant line to form an independent closed circuit, and a coolant cooled in the second radiator cools the electrical equipment while circulating by operation of the second water pump.

9. The heat pump system for the vehicle of claim 1, wherein, when a heating mode of the vehicle is executed using the electrical equipment cooling device, the second branch line is closed by operation of the first valve, and the third branch line is opened, the second coolant line that connects the electrical equipment and the second radiator is closed while in a state that the fourth branch line is opened by operation of the fourth valve in the electrical equipment cooling device, the second connection line forms an independent closed circuit by operation of the third valve, a coolant circulates along the second connection line by operation of the fourth water pump in the heating device, and a refrigerant circulates, the expansion valve and the evaporator stop operation, and the sub-expansion valve operates to expand a refrigerant having passed through the sub-condenser and supplies the expanded refrigerant to the main heat exchanger in the CE module.

10. The heat pump system for the vehicle of claim 9, wherein waste heat generated from the electrical equipment increases a temperature of a coolant that circulates along the second coolant line, the coolant having the increased temperature is recovered while increasing a temperature of a refrigerant that passes through the main heat exchanger, and the coolant circulating along the second connection line is supplied to the heater while being heated through heat-exchange with a high-temperature refrigerant supplied from the compressor in the sub-condenser.

11. The heat pump system for the vehicle of claim 1, wherein, when a heating mode of the vehicle is executed using the engine cooling device and the electrical equipment cooling device, the first branch line is opened by operation of the thermostat, the first coolant line and the second connection line are connected by operation of the third valve, and the first coolant line that connects the thermostat and the first radiator is closed, the second branch line is closed by operation of the first valve, the third branch line is opened, and the second coolant line that connects the electrical equipment and the second radiator is closed when the fourth branch line is opened by operation of the fourth valve in the electrical equipment cooling device, a coolant having a temperature that increases while passing through the engine is supplied to the second connection line through the third valve while circulating along the first coolant line and the first branch line, a high-temperature coolant that circulates along the second connection line is supplied to the heater from the first coolant line by operation of the fourth water pump in the heating device, and a refrigerant circulates, the expansion valve and the evaporator stop operation, and the sub-expansion valve operates to expand a refrigerant having passed through the sub-condenser and supplies the expanded refrigerant to the main heat exchanger in the CE module.

12. The heat pump system for the vehicle of claim 11, wherein waste heat generated from the engine and the electrical equipment increases a temperature of a coolant that circulates along the first, second, and third coolant lines, a coolant having the increased temperature, circulating along the second coolant line, is recovered while increasing a temperature of a refrigerant that passes through the main heat exchanger, and a high-temperature coolant that circulates along the second connection line from the first coolant line is further heated through heat-exchange with a high-temperature refrigerant supplied from the compressor in the sub-condenser and then supplied to the heater in the heating device.

13. The heat pump system of claim 1, wherein, in a dehumidifying mode of the vehicle, the first branch line is opened by operation of the thermostat, the first coolant line and the second connection line are connected by operation of the third valve, and the first coolant line that connects the thermostat and the first radiator is closed, the third branch line is opened, and the second coolant that connects the electrical equipment and the second radiator is closed while the fourth branch line is opened by operation of the fourth valve, a coolant of which a temperature is increased while passing through the engine is supplied to the second connection line through the third valve while circulating along the first coolant line and the first branch line, a high-temperature coolant that circulates along the second connection line from the first coolant line is supplied to the heater by operation of the fourth water pump in the heating device, the first connection line forms an independent closed circuit by operation of the second valve in the air conditioner, and a refrigerant circulates, the main heat exchanger condenses the refrigerant, and the sub-condenser and the sub-expansion valve stop operation in the CE module.

14. The heat pump system for the vehicle of claim 13, wherein the evaporator cools a coolant that circulates to the first connection line by operation of the second valve through heat-exchange with a low-temperature evaporated refrigerant, and a low-temperature coolant having passed through the evaporator is supplied to the cooler along the first connection line by operation of the third water pump.

15. The heat pump system for the vehicle of claim 1, wherein a coolant that circulates in the CE module is an R152-a, R744, or R290 refrigerant.

16. The heat pump system for the vehicle of claim 1, wherein the heating device further includes an internal heater disposed in the second connection line.

* * * * *